(12) United States Patent
Zhang et al.

(10) Patent No.: US 10,259,751 B2
(45) Date of Patent: Apr. 16, 2019

(54) TUNGSTEN CARBIDE-CUBIC BORON NITRIDE COMPOSITE MATERIAL AND PREPARATION METHOD THEREOF

(71) Applicant: Hohai University, Nanjing, Jiangsu (CN)

(72) Inventors: Jianfeng Zhang, Jiangsu (CN); Yuping Wu, Jiangsu (CN); Sheng Hong, Jiangsu (CN); Gaiye Li, Jiangsu (CN); Wenmin Guo, Jiangsu (CN)

(73) Assignee: Hohai University, Nanjing, Jiangsu (CN)

( * ) Notice: Subject to any disclaimer, the term of this patent is extended or adjusted under 35 U.S.C. 154(b) by 150 days.

(21) Appl. No.: 15/318,379

(22) PCT Filed: Jun. 30, 2015

(86) PCT No.: PCT/CN2015/082923
§ 371 (c)(1),
(2) Date: Dec. 13, 2016

(87) PCT Pub. No.: WO2015/192815
PCT Pub. Date: Dec. 23, 2015

(65) Prior Publication Data
US 2017/0121230 A1   May 4, 2017

(30) Foreign Application Priority Data

Jun. 18, 2014 (CN) .......................... 2014 1 0271242

(51) Int. Cl.
*C04B 35/56* (2006.01)
*C04B 35/628* (2006.01)
*C04B 35/645* (2006.01)

(52) U.S. Cl.
CPC .... *C04B 35/5626* (2013.01); *C04B 35/62807* (2013.01); *C04B 35/62842* (2013.01);
(Continued)

(58) Field of Classification Search
CPC ........ C04B 35/5626; C04B 2235/3847; C04B 35/583; C04B 2235/386; C04B 35/62884; C04B 35/62807; C04B 35/62842
See application file for complete search history.

(56) References Cited

U.S. PATENT DOCUMENTS

| | | | |
|---|---|---|---|
| 5,998,049 A * | 12/1999 | Tanaka | C22C 29/00 219/541 |
| 6,613,383 B1 * | 9/2003 | George | B01J 2/006 427/212 |

(Continued)

FOREIGN PATENT DOCUMENTS

| | | |
|---|---|---|
| CN | 1924047 | 3/2007 |
| CN | 104072138 | 10/2014 |

OTHER PUBLICATIONS

International Search Report of PCT/CN2015/082923 dated Aug. 31, 2015, 8 pages (English and Chinese).

(Continued)

*Primary Examiner* — Erin Snelting
(74) *Attorney, Agent, or Firm* — Rankin, Hill & Clark LLP

(57) ABSTRACT

A tungsten carbide-cubic boron nitride composite material and preparation method thereof mainly includes WC and cBN, wherein the WC powder is coated with Co nano-layer and the cBN powder is coated with $SiO_2$ nano-layer, and hardness and toughness of the composition material can be improved by coating. The method for preparing a tungsten carbide-cubic boron nitride composite material adopts chemical vapor deposition method and high temperature sintering method. First nano-layers were coated on the surface of WC and cBN, and then the bulk materials can be obtained via high-temperature sintering.

8 Claims, 1 Drawing Sheet

(52) U.S. Cl.
CPC .. *C04B 35/62884* (2013.01); *C04B 35/62897* (2013.01); *C04B 35/645* (2013.01); *C04B 2235/386* (2013.01); *C04B 2235/3847* (2013.01); *C04B 2235/54* (2013.01); *C04B 2235/5436* (2013.01); *C04B 2235/602* (2013.01); *C04B 2235/656* (2013.01); *C04B 2235/6567* (2013.01); *C04B 2235/77* (2013.01); *C04B 2235/96* (2013.01)

(56) References Cited

U.S. PATENT DOCUMENTS

| | | | | |
|---|---|---|---|---|
| 2003/0026989 | A1* | 2/2003 | George | B01J 2/006 428/402 |
| 2004/0052593 | A1* | 3/2004 | Anderson | B23B 27/143 407/119 |
| 2005/0208754 | A1* | 9/2005 | Kostamo | C23C 16/40 438/622 |
| 2008/0073127 | A1* | 3/2008 | Zhan | B24D 3/02 175/434 |
| 2013/0302980 | A1* | 11/2013 | Chandrashekar | H01L 21/76877 438/666 |
| 2013/0309468 | A1* | 11/2013 | Kudo | C04B 35/583 428/216 |
| 2014/0315015 | A1* | 10/2014 | Fukushima | C04B 41/87 428/336 |
| 2015/0132076 | A1* | 5/2015 | Miyashita | C04B 35/5831 407/119 |
| 2016/0052828 | A1* | 2/2016 | Andersin | C04B 35/5831 29/557 |

OTHER PUBLICATIONS

Written Opinion of PCT/CN2015/082923 dated Aug. 21, 2015, 4 pages.
Li, Yanbo et al..: "Study of Polycrystalline CBN Sintered", Tool Engineering, vol. 42, No. 7, Jul. 31, 2008 (Jul. 31, 2008), pp. 26-27 (Abstract only).
Zhang, Jianfeng et al.: "Evaluation of CVD-deposited SiO2 as a Sintering Aid for Cubic Boron Nitride Consolidated with Alumina by Spark Plasma Sintering", Journal of the American Ceramic Society, vol. 9, No. 95, Sep. 30, 2012 (Sep. 30, 2012), pp. 2827-2832 (Abstract only).

* cited by examiner

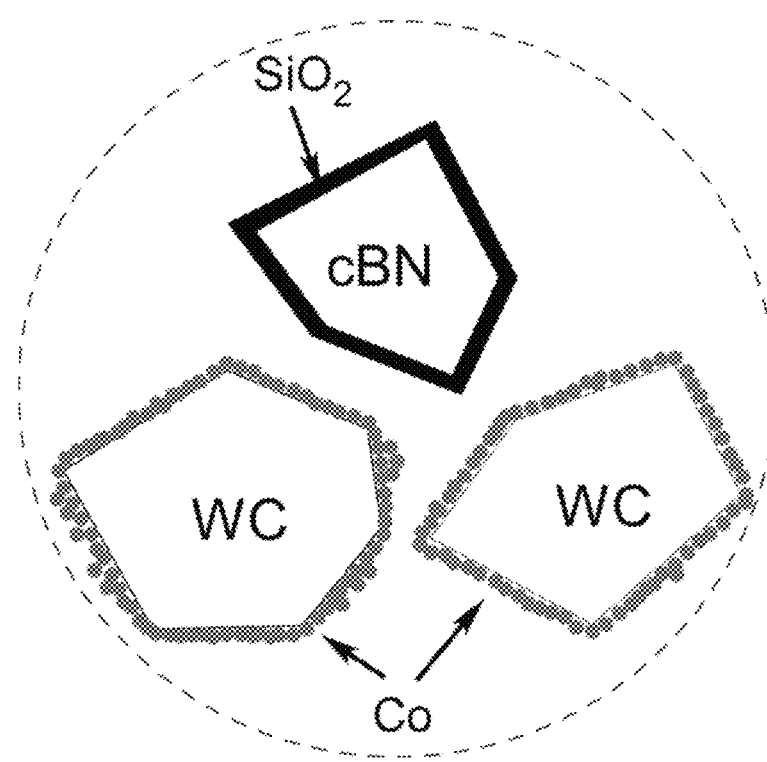

TUNGSTEN CARBIDE-CUBIC BORON NITRIDE COMPOSITE MATERIAL AND PREPARATION METHOD THEREOF

TECHNICAL FIELD

The invention relates to the field of material processing engineering, in particular to high-speed cutting cutter material with high density and high performance, and surface treatment and preparation method thereof.

BACKGROUND

At present, cutting or grinding processing is still main process means for the finally formation of components. One of the main development directions of cutting machining is high-speed cutting (including high-speed soft cutting, high-speed hard cutting, high-speed dray cutting and large feed cutting, etc.). Going through the four stages of theoretical exploration, application exploration, preliminary app3lication and mature application, high-speed cutting technology has achieved a certain development and promotion, and the cutting speed for processing the steel has reached 2000 m·min$^{-1}$, and 3000 m·min$^{-1}$ for processing cast iron, and 7000 m·min$^{-1}$ for aluminum alloy, which is 5~10 times of common cutting speed. High-speed cutting has drawing more and more attention in industry, because it has significant advantages relative to traditional processing, such as short processing time, (high efficiency and low cost), high-quality workpiece surface (high surface accuracy), cooling liquid free (green processing and no environmental pollution) and can process special materials such as quenched steel which is difficult to deal with for traditional processing.

To be used as high-speed cutting cutter material, the materials should have good mechanical property and thermal stability, specifically, it should have properties such as high hardness, shock resistance, wear resistant and thermal fatigue resistance. At present, high-speed cutting cutter materials used in industry are mainly cemented carbide, composite silicon nitride ceramics, cubic boron nitride and diamond, etc. Composite material formed by WC and cBN will have the advantages of the two materials. The introduction of super hard cBN will not only significantly improve the hardness and wear resistance of WC cemented carbide, but in condition that, it was used as superhard particles in the composite materials, which will trigger crack deflection so as to further improve the toughness of the material, and due to the combination of performances of good hardness, wear resistance and toughness, WC-cBN composite materials are used as the most potential new generation material in cutter filed, and has caused extensive intention in the worldwide. In 2007, Martinez etc. from National university of Navarre in Spain has prepared WC/Co-cBN composite materials with different cBN content by hot isostatic pressure method. When the cBN content is 30 vol %, the hardness of the composite material is 25 Gpa; when the content of cBN is improved to 50 vol %, more Co sintering aids will be required which will lead to the phase change from cBN to hexagonal boron nitride, and the hardness of the composite material is reduced by 4 GPa (Journal of the American Ceramic Society, 2007, 90, p 415-424). In 2009, Yaman etc. from Eskisehir Osmangazi university of Turkey has prepared WC/6 wt % Co-cBN composite materials with a cBN content of 25% using spark plasma sintering method, though the toughness has reached 12 MPam$^{1/2}$, the highest hardness is only about 21 GPa (Materials Letters, 2009, 63, p 1041-1043), which is lower than the value reported by Martinez. In 2012, Rosinski etc. from Warsaw University of Technology in Poland has prepared WC/Co-cBN composite material using pulse plasma sintering method, the volume content of the prepared cubic boron nitride is 30%, and the highest hardness is about 23 GPa (Journal of Materials Science, 2012, 47, p 7064-7071). In 2007, Xiaoliang SHI etc. from national key laboratory of new technology of composite materials of Wuhan University performed pretreatment to cBN by coating metallic titanium (Ti) to the surface using chemical vapor deposition method, and prepared WC-10Co-cBN composite material with a cBN volume fraction of 30% using hot pressed sintering method under 30 MPa, 1380° C. for 60 min, the prepared material has a relative density of 94.2% and an intensity of 750 MPa (Material Of Mechanical Engineering, 2007, 31, p 71-73). Besides these scientific research institutions, Sandvik Intellectual Property Ab. (world's leading cutting tool manufacturers) from Sweden has also disclosed a patent on WC-cBN composite material (Method for producing a sintered composite body, Patent WO2012038529A2, Sandvik Intellectual Property Ab.), using Co as sintering aids, and prepared WC/Co-cBN composite material under 1350° C. using pressureless sintering, but the highest hardness of the prepared composite material is 13 GPa.

In conclusion, though preliminary achievement of the WC-cBN composite material has been gained home and abroad, there still exist problems such as difficult to densification, deficiency in hardness and wear-resisting property in composite material. WC and cBN are both material hard to be sintered, usually their composite materials can be prepared using Co, Ni etc as sintering aids (with a common weight content of about 6-15 wt % or higher) and performing pressureless sintering or pressure sintering under high temperature for a long time. But the hardness of metals such as Co, Ni is low, which will lead to the reduction of the hardness of the composite material, especially for red hardness. On the other hand, high content metal sintering aids will also accelerate the phase change from cBN to hexagonal boron nitride (hBN). Moreover, hBN is soft graphite phase, which has a similar hardness as graphite, so the phase change from cBN to hBN will also cause hardness reduction of the composite material. In addition, the volume change caused by the phase change will lead to the increment of material porosity, which will also cause the reduction of the hardness and wear-resisting property for the cutter materials, and led to the further shorten life time of the material.

BRIEF DESCRIPTION

Object of the invention: to solve the technical problems in the prior art, the invention provides a kind of tungsten carbide-cubic boron nitride composite material and preparation method thereof, in which by coating SiO$_2$ and Co nano-layer over WC and cBN powders, the sintering property thereof can be improved, the phase change of cBN can be prevented and the hardness of the material can be improved.

Technical solution: A tungsten carbide-cubic boron nitride composite material is disclosed herein which mainly comprises of WC and cBN, wherein the WC powder is coated with a Co nano-layer of 60-120 nm, and the cBN powder is coated with SiO$_2$ nano-layer of 20-100 nm, and the content of coated cBN in the mixed powders is 30-50 vol % by volume, and the purity of WC and cBN powders are both larger than 95%.

Preferably, the mean particle size of WC powders is 2 µm.

Preferably, the mean particle size of cBN powders is 3 µm.

A method for preparing a tungsten carbide-cubic boron nitride composite material, comprising the following steps of:

(1) placing WC powders into chemical vapor deposition reaction chamber, pumping vacuum, preheating to 500-700° C., using cobaltocene as raw material, setting the evaporating temperature as 120-150° C., rotating the reaction chamber and reacting for 18-50 min for coating, after the coating is over, stopping rotating, and stopping to supplying the raw material, and taking out after cooling to room temperature;

(2) placing cBN powders into the chemical vapor deposition reaction chamber, pumping vacuum, preheating to 500-700° C., using ethyl orthosilicate as raw material, heating to 80-130° C., rotating the reaction chamber and reacting for 15-50 min for coating, after the coating is over, stopping rotating, and stopping to supplying the raw material, and taking out after cooling to room temperature;

(3) mixing the coated WC and cBN powders, wherein the content of the coated cBN in the mixed powders is 9%-18% by weight, and then performing sieving;

(4) placing the sieved and mixed powders into a mould, sintering to prepare bulk material to obtain tungsten carbide-cubic boron nitride composite material.

Wherein, the sintering temperature is the sintering time is 1200-1500° C., the pressure is 4-8 GPa, and the time is 0.5-2 h while sintering.

Preferably, the coating of WC powders is performed under the protection of argon, and the gas flow of argon is 20-50 sccm.

Preferably, the coating of cBN powders is performed under the protection of argon, and the gas flow of argon is 10-30 sccm.

Preferably, the rotating rate of the reaction chamber is 30-60 r/min in step (1) and (2).

Preferably, the coated WC powders and cBN powders are mixed by rotating-drum method, and the mixing time is 5-10 h.

Preferably, the sieve pore for sieving the mixed WC and cBN powders is 100-200 mesh, and the powder is sieved 3 times.

Beneficial effects: The present invention discloses a tungsten carbide-cubic boron nitride composite material and preparation method thereof, adopting chemical vapor deposition method and high temperature sintering method. Specifically, first the WC powder is coated with Co nano-layer and the cBN powder is coated with $SiO_2$ nano-layer, by coating the surface of the powders and mixing evenly, the amount of soft phase particle Co can be reduced, sand the hardness of the composite material can be improved. The coating of $SiO_2$ amorphous nano-layer over cBN can be realized by the oxidative decomposition of ethyl orthosilicate, which can prevent the phase change of cBN during the sintering and improve the mechanical properties of the material such as hardness. The prepared tungsten carbide-cubic boron nitride composite material has good thermal stability and high hardness, and can be used as high speed cutting cutter material or be used as special material in molding field of titanium alloy and chilled cast iron that which were difficult to be treated for traditional cutters. In addition, the invention provides a simple preparation method and has low cost, and can realize large-scale commercial production.

BRIEF DESCRIPTION OF THE DRAWINGS

FIG. 1 illustrates the coating of WC and cBN powders in the tungsten carbide-cubic boron nitride composite material of the present invention.

DETAILED DESCRIPTION

For a better understanding of the invention, preferred embodiments of the invention are described below with reference to the embodiments, but it is to be understood that these descriptions are merely illustrative of the features and advantages of the invention and are not intended to be limiting of the invention as claimed.

The tungsten carbide-cubic boron nitride composite material is prepared by the preparation method of tungsten carbide-cubic boron nitride composite material according to the invention. The material is selected from the metallic materials with the purity of more than 95% and the metal organic materials with the purity of more than 98%, wherein the mean particle size of the WC powder is 2 μm and the mean particle size of the cBN powder is 3 μm, all the materials have been degassed and dehumidified in vacuum before being subjected to the chemical vapor deposition treatment, and then prepared according to the preparation method provided by the present invention.

Embodiment 1

According to the method for preparing tungsten carbide-cubic boron nitride composite material provided by the invention, the prepared tungsten carbide-cubic boron nitride composite material is prepared as follows:

(1) placing WC powders into chemical vapor deposition reaction chamber, pumping vacuum to 5 Pa, preheating to 500° C., using cobaltocene as raw material, setting the evaporating temperature as 120° C., rotating the reaction chamber at a rotating rate of 30 r/min, with a argon gas flow of 20 sccm, and coating the Co nano-layer over the WC powders by the thermal decomposition of cobaltocene, reacting for 20 min for coating, after the coating is over, stopping rotating, and stopping to supplying the raw material, and taking out after cooling to room temperature;

(2) placing cBN powders into the chemical vapor deposition reaction chamber, pumping vacuum to 5 Pa, preheating to 500° C., using ethyl orthosilicate as raw material, heating to 80° C., rotating the reaction chamber at a rotating rate of 30 r/min, the gas flow rate of argon is 10 sccm, and coating the $SiO_2$ nano-layer over the cBN powders by the thermal decomposition of ethyl orthosilicate and reacting for 20 min for coating, after the coating is over, stopping rotating, and stopping to supplying the raw material, and taking out after cooling to room temperature;

determining the particle size and thickness of the nano-layer on the particle surface by combination of FESEM and TEM, the thickness of the $SiO_2$ nano-layer was 20 nm, the particle size of the Co powder on the WC powder surface was 20 nm, and the thickness was 60 nm;

(3) mixing 9.1 g coated WC and 0.9 g coated cBN powders by rotating-drum method for 5 h, and then sieving though 100 mesh sieve for 3 times;

(4) placing the sieved and mixed powders into a mould, sintering to prepare bulk material to obtain tungsten carbide-cubic boron nitride composite material, the sintering temperature is 1200° C., and the sintering time is 2 h, the pressure is 4 GPa while sintering, after sintering, the content of cBN phase is 30% by volume, the diameter of the prepared sample is 30 mm, and the thickness is 5 mm.

Embodiment 2

According to the method for preparing tungsten carbide-cubic boron nitride composite material provided by the invention, the prepared tungsten carbide-cubic boron nitride composite material is prepared as follows:

(1) placing WC powders into chemical vapor deposition reaction chamber, pumping vacuum to 10 Pa, preheating to 500° C., using cobaltocene as raw material, setting the evaporating temperature as 130° C., rotating the reaction chamber at a rotating rate of 45 r/min, with a argon gas flow of 30 sccm, and coating the Co nano-layer over the WC powders by the thermal decomposition of cobaltocene, reacting for 18 min for coating, after the coating is over, stopping rotating, and stopping to supplying the raw material, and taking out after cooling to room temperature;

(2) placing cBN powders into the chemical vapor deposition reaction chamber, pumping vacuum to 10 Pa, preheating to 500° C., using ethyl orthosilicate as raw material, heating to 120° C., rotating the reaction chamber at a rotating rate of 50 r0/min, the gas flow rate of argon is 20 sccm, and coating the $SiO_2$ nano-layer over the cBN powders by the thermal decomposition of ethyl orthosilicate and reacting for 15 min for coating, after the coating is over, stopping rotating, and stopping to supplying the raw material, and taking out after cooling to room temperature;

determining the particle size and thickness of the nano-layer on the particle surface by combination of FESEM and TEM, the thickness of the $SiO_2$ nano-layer was 20 nm, the particle size of the Co powder on the WC powder surface was 20 nm, and the thickness was 60 nm;

(3) mixing 8.9 g coated WC and 1.1 g coated cBN powders by rotating-drum method for 10 h, and then sieving though 200 mesh sieve for 3 times;

(4) placing the sieved and mixed powders into a mould, sintering to prepare bulk material to obtain tungsten carbide-cubic boron nitride composite material, the sintering temperature is 1300° C., and the sintering time is 1.5 h, the pressure is 6 GPa while sintering, after sintering, the content of cBN phase is 35% by volume, the diameter of the prepared sample is 30 mm, and the thickness is 5 mm.

Embodiment 3

According to the method for preparing tungsten carbide-cubic boron nitride composite material provided by the invention, the prepared tungsten carbide-cubic boron nitride composite material is prepared as follows:

(1) placing WC powders into chemical vapor deposition reaction chamber, pumping vacuum to 20 Pa, preheating to 500° C., using cobaltocene as raw material, setting the evaporating temperature as 140° C., rotating the reaction chamber at a rotating rate of 60 r/min, with a argon gas flow of 40 sccm, and coating the Co nano-layer over the WC powders by the thermal decomposition of cobaltocene, reacting for 50 min for coating, after the coating is over, stopping rotating, and stopping to supplying the raw material, and taking out after cooling to room temperature;

(2) placing cBN powders into the chemical vapor deposition reaction chamber, pumping vacuum to 20 Pa, preheating to 500° C., using ethyl orthosilicate as raw material, heating to 90° C., rotating the reaction chamber at a rotating rate of 40 r/min, the gas flow rate of argon is 30 sccm, and coating the $SiO_2$ nano-layer over the cBN powders by the thermal decomposition of ethyl orthosilicate and reacting for 50 min for coating, after the coating is over, stopping rotating, and stopping to supplying the raw material, and taking out after cooling to room temperature;

determining the particle size and thickness of the nano-layer on the particle surface by combination of FESEM and TEM, the thickness of the $SiO_2$ nano-layer was 50 nm, the particle size of the Co powder on the WC powder surface was 40 nm, and the thickness was 120 nm;

(3) mixing 8.7 g coated WC and 1.3 g coated cBN powders by rotating-drum method for 10 h, and then sieving though 200 mesh sieve for 3 times;

(4) placing the sieved and mixed powders into a mould, sintering to prepare bulk material to obtain tungsten carbide-cubic boron nitride composite material, the sintering temperature is 1400° C., and the sintering time is 0.5 h, the pressure is 5 GPa while sintering, after sintering, the content of cBN phase is 40% by volume, the diameter of the prepared sample is 30 mm, and the thickness is 5 mm.

Embodiment 4

According to the method for preparing tungsten carbide-cubic boron nitride composite material provided by the invention, the prepared tungsten carbide-cubic boron nitride composite material is prepared as follows:

(1) placing WC powders into chemical vapor deposition reaction chamber, pumping vacuum to 15 Pa, preheating to 500° C., using cobaltocene as raw material, setting the evaporating temperature as 150° C., rotating the reaction chamber at a rotating rate of 35 r/min, with a argon gas flow of 40 sccm, and coating the Co nano-layer over the WC powders by the thermal decomposition of cobaltocene, reacting for 40 min for coating, after the coating is over, stopping rotating, and stopping to supplying the raw material, and taking out after cooling to room temperature;

(2) placing cBN powders into the chemical vapor deposition reaction chamber, pumping vacuum to 15 Pa, preheating to 500° C., using ethyl orthosilicate as raw material, heating to 130° C., rotating the reaction chamber at a rotating rate of 35 r/min, the gas flow rate of argon is 25 sccm, and coating the $SiO_2$ nano-layer over the cBN powders by the thermal decomposition of ethyl orthosilicate and reacting for 40 min for coating, after the coating is over, stopping rotating, and stopping to supplying the raw material, and taking out after cooling to room temperature;

determining the particle size and thickness of the nano-layer on the particle surface by combination of FESEM and TEM, the thickness of the $SiO_2$ nano-layer was 100 nm, the particle size of the Co powder on the WC powder surface was 40 nm, and the thickness was 120 nm;

(3) mixing 8.5 g coated WC and 1.5 g coated cBN powders by rotating-drum method for 6 h, and then sieving though 100 mesh sieve for 3 times;

(4) placing the sieved and mixed powders into a mould, sintering to prepare bulk material to obtain tungsten carbide-cubic boron nitride composite material, the sintering temperature is 1400° C., and the sintering time is 1.5 h, the pressure is 5 GPa while sintering, after sintering, the content of cBN phase is 45% by volume, the diameter of the prepared sample is 30 mm, and the thickness is 5 mm.

Embodiment 5

According to the method for preparing tungsten carbide-cubic boron nitride composite material provided by the invention, the prepared tungsten carbide-cubic boron nitride composite material is prepared as follows:

(1) placing WC powders into chemical vapor deposition reaction chamber, pumping vacuum to 10 Pa, preheating to 500° C., using cobaltocene as raw material, setting the evaporating temperature as 150° C., rotating the reaction chamber at a rotating rate of 60 r/min, with a argon gas flow of 25 sccm, and coating the Co nano-layer over the WC powders by the thermal decomposition of cobaltocene, reacting for 20 min for coating, after the coating is over, stopping rotating, and stopping to supplying the raw material, and taking out after cooling to room temperature;

(2) placing cBN powders into the chemical vapor deposition reaction chamber, pumping vacuum to 20 Pa, preheating to 500° C., using ethyl orthosilicate as raw material, heating to 130° C., rotating the reaction chamber at a rotating rate of 60 r/min, the gas flow rate of argon is 25 sccm, and coating the $SiO_2$ nano-layer over the cBN powders by the thermal decomposition of ethyl orthosilicate and reacting for 25 min for coating, after the coating is over, stopping rotating, and stopping to supplying the raw material, and taking out after cooling to room temperature;

determining the particle size and thickness of the nano-layer on the particle surface by combination of FESEM and TEM, the thickness of the $SiO_2$ nano-layer was 40 nm, the particle size of the Co powder on the WC powder surface was 30 nm, and the thickness was 60 nm;

(3) mixing 8.5 g coated WC and 1.5 g coated cBN powders by rotating-drum method for 6 h, and then sieving though 100 mesh sieve for 3 times;

(4) placing the sieved and mixed powders into a mould, sintering to prepare bulk material to obtain tungsten carbide-cubic boron nitride composite material, the sintering temperature is 1500° C., and the sintering time is 0.5 h, the pressure is 8 GPa while sintering, after sintering, the content of cBN phase is 50% by volume, the diameter of the prepared sample is 30 mm, and the thickness is 5 mm.

The hardness and the fracture toughness of the WC-cBN composite material were measured by Vickers hardness indentation method, and the strength of the material was measured by the tensile method. The results are as follows:

TABLE 1 density, hardness, toughness and strength of the WC-cBN composite material

| Embodiment | Density/% | Hardness/GPa | Toughness/MPa $m^{1/2}$ | Strength |
|---|---|---|---|---|
| 1 | 95.2 | 30 | 11.8 | 950 |
| 2 | 96.5 | 32 | 12.6 | 1200 |
| 3 | 95.3 | 33 | 13.4 | 1100 |
| 4 | 98.8 | 35 | 13.2 | 1360 |
| 5 | 97.9 | 34 | 11.1 | 1300 |

It can be seen from the table that, the WC-cBN composite material prepared by the present invention has high hardness, toughness and strength, and while the volume content of the coated cBN phase is increased from 30% to 50%, the density of the WC-cBN composite material presents fluctuations. When the volume content of the coated cBN phase is 45%, the density reaches the highest point. The hardness index of the composites showed a tendency to increase first and then decrease with the increase of the volume content of the cBN phase after coating. The hardness of the composites was the highest when the content of cBN phase was 45%. The toughness of the composites exhibits a similar trend with the change of the hardness index, and the toughness is the highest when the volume content of the coated cBN phase reaches 40%. The strength of the composites exhibits a similar trend with the change of the density index, and the strength is the highest when the volume content of the coated cBN phase reaches 45%.

The foregoing description of the disclosed embodiments will enable those skilled in the art to make or use the invention. Numerous modifications to these embodiments will be readily apparent to those skilled in the art, and the generic principles defined herein may be implemented in other embodiments without departing from the spirit or scope of the invention. Accordingly, the present invention is not intended to be limited to the embodiments shown herein, but is to be accorded the widest scope consistent with the principles and novel features disclosed herein.

The invention claimed is:

1. A method for preparing a tungsten carbide-cubic boron nitride composite material, comprising the following steps of:
   (1) placing WC powders into a chemical vapor deposition reaction chamber, pumping vacuum, preheating the reaction chamber to 500-700° C., using supplying cobaltocene to the reaction chamber, rotating the reaction chamber and reacting the cobaltocene for 18-50 min for coating the WC powders, after the WC powders are coated, stop rotating the reaction chamber, and stop supplying the cobaltocene to the reaction chamber, and taking out coated WC powders from the reaction chamber after cooling the coated WC powders to room temperature;
   (2) placing cBN powders into the chemical vapor deposition reaction chamber, pumping vacuum, preheating the reaction chamber to 500-700° C., supplying ethyl orthosilicate to the reaction chamber, rotating the reaction chamber and reacting the ethyl orthosilicate for 15-50 min for coating the cBN powders, after the cBN powders are coated, stop rotating the reaction chamber, and stop supplying the ethyl orthosilicate to the reaction chamber, and taking out coated cBN powders from the reaction chamber after cooling the coated cBN powders to room temperature;
   (3) mixing the coated WC powders and the coated cBN powders, wherein the content of the coated cBN powders in the mixed powders is 9%-18% by weight, and then performing sieving;
   (4) placing the sieved and mixed powders into a mould, sintering the sieved and mixed powders to prepare a bulk material of tungsten carbide-cubic boron nitride composite material, the sintering being performed at a temperature of 1200-1500° C., a pressure of 4-8 GPa, and for a time of 0.5-2 h.

2. The preparation method according to claim 1, wherein the coating of WC powders is performed under the protection of a gas flow of argon, and the gas flow of argon is 20-50 sccm.

3. The preparation method according to claim 1, wherein the coating of cBN powders is performed under the protection of a gas flow of argon, and the gas flow of argon is 10-30 sccm.

4. The preparation method according to claim 1, wherein the rotating rate of the reaction chamber is 30-60 r/min in step (1) and (2).

5. The preparation method according to claim 1, wherein the coated WC powders and cBN powders are mixed by a rotating-drum method, and the mixing time is 5-10 h.

6. The preparation method according to claim 1, wherein the sieve pore for sieving the mixed WC and cBN powders is 100-200 mesh, and the powder is sieved 3 times.

7. The preparation method according to claim 1, wherein the mean particle size of WC powders is 2 μm in step (1).

8. The preparation method according to claim 1, wherein the mean particle size of cBN powders is 3 μm in step (2).

* * * * *